United States Patent [19]

Yamada

[11] 4,427,281

[45] Jan. 24, 1984

[54] SINGLE LENS REFLEX CAMERA

[75] Inventor: Akira Yamada, Tokyo, Japan

[73] Assignee: Canon Kabushiki Kaisha, Tokyo, Japan

[21] Appl. No.: 407,325

[22] Filed: Aug. 12, 1982

[30] Foreign Application Priority Data

Aug. 20, 1981 [JP] Japan ................................ 56-130484

[51] Int. Cl.³ ...................... G03B 13/02; G03B 17/18
[52] U.S. Cl. ................................. 354/219; 354/289.12
[58] Field of Search .................. 354/60 R, 60 E, 152, 354/155, 219, 224, 225, 288, 289

[56] References Cited

U.S. PATENT DOCUMENTS

| | | | |
|---|---|---|---|
| 3,846,805 | 11/1974 | Kiyohara et al. | 354/288 X |
| 4,025,935 | 5/1977 | Wagensonner | 354/60 R X |
| 4,223,987 | 9/1980 | Shimizu et al. | 354/289 X |
| 4,306,807 | 12/1981 | Sakane et al. | 354/60 R X |
| 4,359,277 | 11/1982 | Shimizu et al. | 354/289 X |

Primary Examiner—William B. Perkey
Attorney, Agent, or Firm—Toren, McGeady and Stanger

[57] ABSTRACT

A DC/DC converter is provided above the penta prism in a single lens reflex camera for increasing the battery voltage for driving the various electric parts, display parts, etc. necessary to take pictures.

6 Claims, 4 Drawing Figures

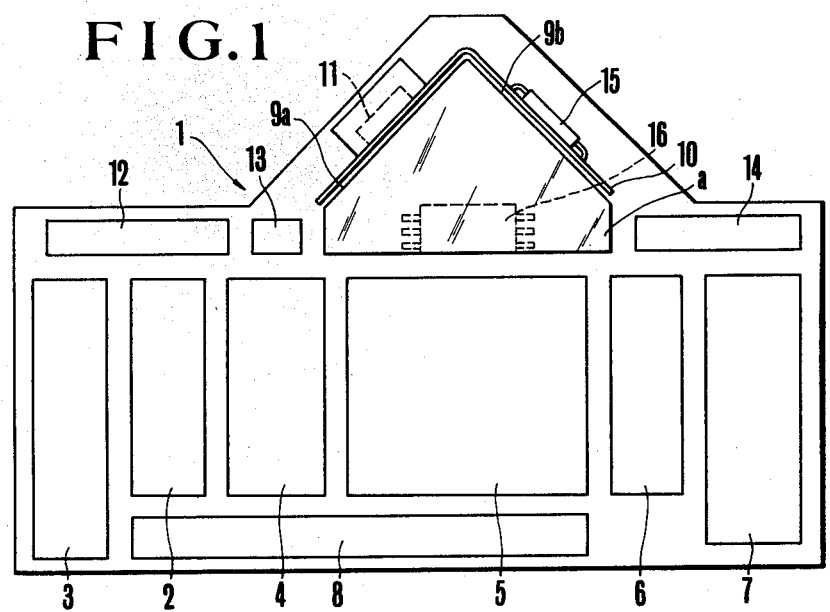
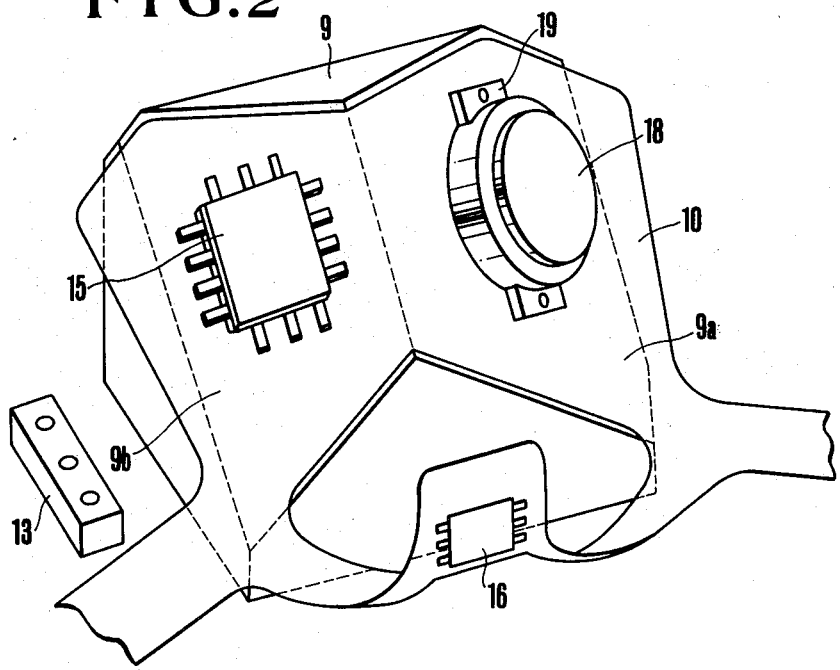

SINGLE LENS REFLEX CAMERA

BACKGROUND OF THE INVENTION

1. Field of the Invention

This invention relates to a single lens reflex camera in which the battery voltage is boosted and this boosted voltage is used in exposure film winding, or the like.

2. Description of the Prior Art

In the past, as the single lens reflex cameras worked with the help of a voltage of at least 3 volts for driving the exposure control IC and the information displays such as the buzzer and LEDs, all that was required for the voltage to be available was to provide a space for a 4G13 type battery or the like in within the camera housing. Motorizing the film winding of the single lens reflex camera, four Penlight (size AA) batteries had to be used as the electrical energy source of the motor.

Recently, however, to provide the single lens reflex camera with a device for electrically finding a distance from the camera to an object to be photographed, it has been necessary to increase the voltage to 6 volts or more. Also, in the camera having incorporated therein the film winding motor; there is a strong demand for reducing the number of Penlight (size AA) batteries required for driving the motor to two to prevent a large increase in the camera bulk and size. However, cameras for meeting these demands require provision of a DC/DC converter for boosting the power source voltage in the camera bodies for the purpose of obtaining a voltage necessary for driving the distance measuring device, the motor, etc. as mentioned above and also for the purpose of stabilizing the voltage to be supplied to the controlling I.C.—the distance measuring I.C.—the indication element, etc. against the variation of the power source voltage due to the driving of the motor, etc.

The DC/DC converter first oscillates the direct current by using transistors or the like and, after increasing the voltage, is converted to a direct current. Therefore, the incorporation of this apparatus in the camera is liable to produce various electrical accidents. For example, the power line connecting the DC/DC converter with the battery and the ground line (hereinafter described as "GND" line) may oscillate, and the DC/DC converter itself produces induction noise, thereby causing faulty operation of an exposure control IC and light metering IC and a large decrease in the exposure control accuracy. Another disadvantage arising from improper arrangement of the DC/DC converter is that as the outer shape of the camera must be increased to awkward, dimensions it is difficult to design a camera with a smart outer appearance.

With the foregoing in mind, it is an object of the present invention to provide a single lens reflex camera having incorporated therein a DC/DC converter while still permitting the compact form to be preserved by effectively utilizing the substantial volume of the camera.

Another object of the present invention is to provide a single lens reflex camera capable of preventing electrical accidents resulting from the incorporation of the DC/DC converter.

These and other objects of the present invention will become apparent from the following description of an embodiment thereof.

SUMMARY OF THE INVENTION

It has now been found that these objects may be obtained in a single lens reflex camera which includes a penta prism, an electrical power source, and circuit parts for controlling the camera operation. In such a camera a flexible substrate electrically connects the electrical power source to the circuit parts and the substrate is positioned along the penta prism. A DC/DC converter is positioned above the penta prism and is electrically connected to the electrical power source and also electrically connected to the circuit parts.

In some forms, an electrically conductive case encloses the DC/DC converter, and the case if fixedly secured to the substrate and its potential is held at ground potential.

BRIEF DESCRIPTION OF THE DRAWINGS

FIG. 1 is a front elevational view of an embodiment of a single lens reflex camera according to the present invention.

FIG. 2 is a perspective view of a penta prism portion in the FIG. 1 embodiment of the invention.

DETAILED DESCRIPTION OF THE PREFERRED EMBODIMENT

Figure 3:
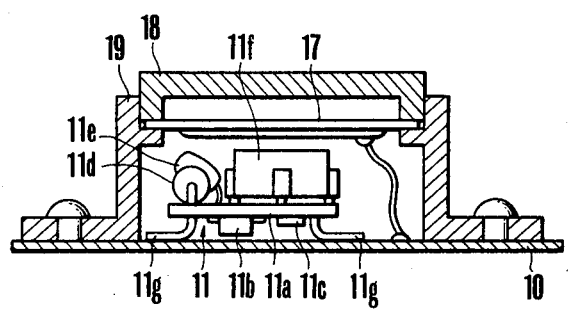
FIG. 3 is an elevational view in partial section illustrating the installation details of a DC/DC converter in the FIG. 1 embodiment of the invention.
Figure 4:
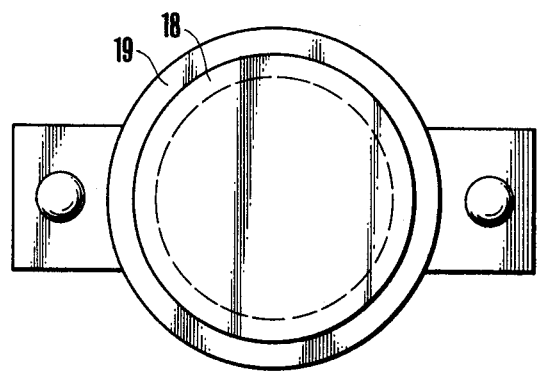
FIG. 4 is a plan view of the apparatus illustrated in FIG. 3.

The present invention will next be described in greater detail in connection with an embodiment thereof by reference to the drawings.

A camera body 1 of a winder-built-in single lens reflex camera has a DC/DC converter installed therein. For the purposes of constructing the camera body 1 in a compact form and lessening the electrical loss of the film transportation mechanism as much as possible the various mechanisms are arranged within the camera housing 1 as follows. Formed along the side wall of one lateral side of the camera housing 1 is a battery chamber 3 for accommodating a battery. Adjacent to this battery chamber 3 there is a motor 2 for driving the film winding mechanism.

To the right of this motor 2 as viewed in FIG. 1, are successively an electromagnetic mechanism 4 for controlling a operation of a shutter, a mirror box 5, an AE control mechanism 6 and a cartridge chamber 7, the cartridge chamber 7 contacting with the side wall of the opposite lateral side. A winding-up front panel charge mechanism 8 is between the aforesaid mechanisms and the bottom panel of the camera housing 1. A penta prism 9 is disposed above the mirror box 5. It is to be noted that the motor 2 is contained in a hollow core of a takeup spool (not shown).

A flexible print substrate 10 electrically connects the aforesaid mechanisms, an exposure control IC 15 and a light metering IC 16 to the battery and is positioned in conformity with the roofs 9a and 9b of the penta prism 9. Positioned through this flexible print substrate 10 on one roof 9a of the penta prism 9, which lies near the battery chamber 3, is a DC/DC converter 11, and an opposite roof 9b which supports the exposure control IC 15. Also, the light metering IC 16 is positioned on an extended portion of the flexible print substrate 10, as illustrated in FIG. 2.

It should be pointed out here that positioning the DC/DC converter 11 at an intermediate point between the battery 3 and the ICs has the following advantages. That is, since the DC/DC converter boosts D.C. voltage, the voltages on the input and GND lines connected to the battery are caused to oscillate. With the use of the aforesaid arrangement, however, the fluctuated voltage is substantially not applied across the two terminals of the IC. For this reason, as compared with another arrangement of the IC between the battery and the DC/DC converter, avoidance of faulty operation of the IC becomes easier to achieve, provided that the variation eliminating percentage of the voltage of the operational amplifier in the IC is constant. Also, as the length of the input and GND lines increases, the loss of the voltage applied to the DC/DC converter increases with a decrease in the efficiency of the DC/DC converter. According to the aforesaid arrangement of the invention, there is no need of such care.

Numeral 12 identifies a release switch and a mode selector switch; 13 numeral indentifies a display in LED form; numeral 14 identifies an ASA sensitivity presetting mechanism, these parts or elements 12, 13 and 14 are positioned adjacent to the flexible print substrate 10. The exposure control IC 15 and light metering IC 16 are directly attached to the flexible print plate 10. Also, the DC/DC converter 11 is positioned within a resonance box 18, 19 for a buzzer 17, as illustrated in FIG. 3. The second feature of the invention is that the DC/DC converter 11 is adapted to be built into the interior of the resonance box 18, 19 for the buzzer, whereby it is allowed to take its place on the penta prism 9. At first, the DC/DC converter 11 is assembled with the flexible print substrate 10 in direct mounting relation. Then, the buzzer 17 is brought into electrical connection with a drive circuit in the flexible print substrate 10. After that, the buzzer holder or resonance box 18, 19, with its bottom open, is put on the flexible print plate 10 to enclose the DC/DC converter 11 and is fastened thereto.

In general, the DC/DC converter 11 occupies a much smaller space than the buzzer 17. If a space which the buzzer resonance box 18, 10 is to occupy is previously created between the penta prism 9 and the finder housing, the object of the invention can be fully accomplished.

The DC/DC converter 11 is constructed with a print substrate 11a on the circuit pattern side (lower side as viewed in FIG. 3) on which are disposed a transistor 11b of chip form, a condenser (not shown) and a resistor 11c on the opposite side of the substrate 11a are inserted, discrete parts, namely, a transformer 11f, a choke coil (not shown), a diode 11d and a tantalum condenser 11e and which are soldered on the circuit pattern. And, these parts are assembled in one unit with the use of interconnection terminals 11g enabling the unit to be fixedly mounted to the flexible print substrate 10.

The construction of such a unit produces advantages: (i) The DC/DC converter can be subjected as one circuit to a performance check of each article in isolation from the control circuit of the entire camera. (ii) Since the DC/DC converter which would otherwise scatter noise sources about is concentrated in one point, it is easier to apply a counter-measure for the noise. (iii) Since the bulk and size of the DC/DC converter itself can be minimized, the mounting density is increased.

Fixedly securing the buzzer holder or resonance box (18, 19) to the plate 10 may be accomplished by a duplex tape or a screw fastener threaded into the reinforced portion of the flexible print substrate 10. In the embodiment of the invention, use is made of solder, while the box (18, 19) is made of metal. The soldered portion is utilized in constituting part of the GND line from the battery loaded in the battery chamber 3 so that the buzzer holding resonance box (18, 19) takes the same potential as the GND, thereby the resonance box (18, 19) enclosing the DC/DC converter 11 also serves as a shield case for the DC/DC converter 11. This also implies that the space within the camera housing 1 is effectively used. In addition thereto, the induction noise produced from the DC/DC converter 11 can be cut off so that the problems such as electrical accidents of the ICs and faulty operation arising from the induction noise can be solved. Also to impart the role of a shield case to the buzzer holding resonance box (18, 19), it is not always necessary to use metal. Other suitable materials of electrical conductivity, for example, carbon-mixed plastics may be used, or an electrical conductive coating may be applied to effect an equivalent result. Plastic, may be manufactured in to various shapes very easily.

Since, in the above embodiment of the invention, the DC/DC converter 11 is on the upper part of the penta prism 9 and since the ICs 15 and 16 and the display LED are also located in the neighbourhood of this converter, an additional advantage is produced in that the power supply paths to those parts can be simplified.

As has been described above, the present invention is to provide an arrangement of the DC/DC converter on the upper part of the penta prism, whereby the narrow space within the camera body can be utilized advantageously and the various mechanisms and circuit parts can be disposed in good order. That is, according to the present invention, besides avoiding the electrical accident which would otherwise result from the noise of the DC/DC converter, it is possible to position the DC/DC converter in the interior of the camera body without causing the operation efficiency of the DC/DC converter to be lowered.

What I claim:
1. A single lens reflex camera including:
    (a) a penta prism;
    (b) an electrical power source;
    (c) circuit parts for controlling camera operation;
    (d) a flexible substrate electrically connecting said electrical power source to said circuit parts, said substrate being positioned along said penta prism; and
    (e) a DC/DC converter positioned above said penta prism through said substrate, said DC/DC converter being electrically connected to said electrical power source and also electrically connected to said circuit parts.
2. A single lens reflex camera according to claim 1, further including:
    (f) an electrically conductive case enclosing said DC/DC converter, said case being fixedly secured to said substrate and its potential is set to ground.
3. A single lens reflex camera according to claim 2, wherein said case is a resonance box containing a sound producing means.
4. A single lens reflex camera including:
    (a) a camera housing;
    (b) a penta prism, said penta prism having a 1st inclined surface and a 2nd inclined surface;

(c) an electrical power source positioned within said camera housing, said electrical power source being arranged nearer to the 2nd inclined surface of said penta prism than to the 1st inclined surface;
(d) circuit parts for controlling camera operation;
(e) a DC/DC converter for boosting the voltage of said electrical power source before being supplied to said circuit parts; and
(f) a flexible substrate positioned along the 1st inclined surface and the 2nd inclined surface of said penta prism, said substrate fixedly carrying said circuit parts above the 1st inclined surface of said penta prism and fixedly carrying said DC/DC converter above the 2nd inclined surface of said penta prism.

5. A single lens reflex camera according to claim 4, further including:
(g) an electrically conductive case enclosing said DC/DC converter, said case being fixedly secured to said substrate and its potential being set to ground.

6. A single lens reflex camera according to claim 5, wherein said case is a resonance box containing a sound producing means.

* * * * *